Patented Sept. 2, 1924.                                                                 1,507,033

UNITED STATES PATENT OFFICE.

AARON T. SEARCY, OF CHICAGO, ILLINOIS.

LIQUID LEATHER CLEANER.

No Drawing.     Application filed January 30, 1922.  Serial No. 532,862.

*To all whom it may concern:*

Be it known that I, AARON T. SEARCY, a citizen of the United States, residing at Chicago, in the county of Cook and State of Illinois, have invented new and useful Improvements in Liquid Leather Cleaners, of which the following is a specification.

The object of the present invention is to produce a leather cleaning compound in a liquid form which is highly efficient in its action, and which will not damage the leather as it contains no acids or other ingredients having a deleterious or destructive effect on leather.

The composition consists of the following ingredients in the quantities stated:

| | |
|---|---|
| Starch | 10 lbs. |
| Soap | 10 bars. |
| Red dye | 2 oz. |
| Benzoate of soda | 1½ oz. |

The soap preferably employed is the well-known Fels Naphtha soap, and for the red dye the "Angel Turkey" brand may be used.

The starch is dissolved in five quarts of hot water and the soap dissolved in three quarts of hot water. The two resultant liquids are then mixed, and the dye and benzoate of soda are added. The ingredients are thoroughly mixed and to the mixture is added eighteen gallons of hot water, after which the resultant liquid is boiled for a period of about thirty minutes. The liquid composition is now ready for use or bottling. The various ingredients in the quantities stated are sufficient to make twenty gallons of the composition.

The dye is used merely for coloring the composition and, as far as known, it has no cleansing effect on the leather. The composition is of milk-like consistency and it contains no acids or other ingredients having deleterious or destructive effects on the leather. The benzoate of soda is employed as a preservative, and by its use deterioration of the compound is prevented, and it will not spoil if kept for a long period of time.

I claim:

A liquid leather cleaner consisting of a solution of a mixture of 10 pounds of starch dissolved in 5 quarts of hot water and 10 bars of standard size of soap dissolved in 3 quarts of hot water, a dye, and benzoate of soda, boiled with 18 gallons of hot water.

In testimony whereof I affix my signature.

AARON T. SEARCY.